(12) United States Patent
Van Gorkum

(10) Patent No.: US 12,091,539 B2
(45) Date of Patent: Sep. 17, 2024

(54) TWO-COMPONENT COATING COMPOSITION, METHOD FOR HOMOGENEOUSLY MIXING A CURING COMPONENT INTO A BINDER COMPONENT, AND USE OF NANO PIGMENTS FOR PROVIDING A MARKER COLOR TO A CURING COMPONENT

(71) Applicant: Akzo Nobel Coatings International B.V., Arnhem (NL)

(72) Inventor: Remy Van Gorkum, Arnhem (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 815 days.

(21) Appl. No.: 16/972,088

(22) PCT Filed: Jun. 4, 2019

(86) PCT No.: PCT/EP2019/064416
§ 371 (c)(1),
(2) Date: Dec. 4, 2020

(87) PCT Pub. No.: WO2019/233980
PCT Pub. Date: Dec. 12, 2019

(65) Prior Publication Data
US 2021/0221993 A1 Jul. 22, 2021

(30) Foreign Application Priority Data
Jun. 7, 2018 (EP) .................................... 18176579

(51) Int. Cl.
| | | |
|---|---|---|
| *C08L 33/08* | (2006.01) | |
| *C08F 220/14* | (2006.01) | |
| *C08F 220/18* | (2006.01) | |
| *C08G 18/12* | (2006.01) | |
| *C08G 18/34* | (2006.01) | |
| *C08G 18/48* | (2006.01) | |
| *C08G 18/67* | (2006.01) | |
| *C08G 18/75* | (2006.01) | |
| *C08K 3/013* | (2018.01) | |
| *C08L 33/10* | (2006.01) | |
| *C09D 5/00* | (2006.01) | |

(52) U.S. Cl.
CPC ............ *C08L 33/08* (2013.01); *C08F 220/14* (2013.01); *C08F 220/1804* (2020.02); *C08G 18/12* (2013.01); *C08G 18/34* (2013.01); *C08G 18/4825* (2013.01); *C08G 18/672* (2013.01); *C08G 18/75* (2013.01); *C08K 3/013* (2018.01); *C08L 33/10* (2013.01); *C09D 5/002* (2013.01); *C08L 2201/50* (2013.01); *C08L 2205/025* (2013.01); *C08L 2205/03* (2013.01)

(58) Field of Classification Search
CPC ...... C08L 33/08; C08L 33/10; C08L 2201/50; C08L 2205/025; C08L 2205/03; C08K 3/013; C08F 220/14; C08G 18/12; C08G 18/34; C08G 18/4825; C08G 18/75; C08G 18/672; C09D 5/002
See application file for complete search history.

(56) References Cited

U.S. PATENT DOCUMENTS

| | | | |
|---|---|---|---|
| 2010/0324199 A1 | 12/2010 | Fickers et al. | .......... C08L 75/04 |
| 2012/0164467 A1 | 6/2012 | Sobczak | ................. C09D 7/12 |

FOREIGN PATENT DOCUMENTS

| | | | |
|---|---|---|---|
| CN | 1986665 | 6/2007 | |
| CN | 101974269 B | 8/2012 | |
| CN | 102652159 | 8/2012 | |
| CN | 102652159 A * | 8/2012 | ........... C09D 133/06 |
| CN | 104403555 | 3/2015 | |
| CN | 105386365 A | 10/2015 | |
| CN | 107057545 A | 8/2017 | |
| CN | 108822720 | 11/2018 | |
| DE | 102007021013 A1 | 11/2008 | |
| EP | 0899312 A1 | 3/1999 | |
| EP | 2133376 A1 | 12/2009 | |
| GB | 2298427 A1 | 9/1996 | |
| JP | 2013029656 | 2/2013 | |
| WO | 00/24837 | 5/2000 | |
| WO | WO-0136552 A1 * | 5/2001 | ............... B05D 7/52 |
| WO | 2006/128875 A1 | 12/2006 | |
| WO | 2011073164 | 6/2011 | |

OTHER PUBLICATIONS

European Search Report issued in EP Application No. 18176579.3, dated Oct. 30, 2018.
International Search Report and Written Opinion for PCT/EP2019/064416, mailed Aug. 30, 2019.
"First Office Action," for Chinese Patent Application No. 201980038221.9 mailed Jul. 6, 2021 (11 pages) with English Translation.

* cited by examiner

*Primary Examiner* — Ling Siu Choi
*Assistant Examiner* — Andrea Wu
(74) *Attorney, Agent, or Firm* — Pauly, DeVries Smith & Deffner LLC

(57) ABSTRACT

The invention relates to an aqueous binder composition comprising three different dispersed polymers: an acrylic polymer a. with a Tg between 80 and 120° C.; an acrylic polymer b. with a Tg between 40 and 60° C.; and a polyurethane modified acrylic polymer c. The binder composition can be used in a coating composition, especially in a primer composition.

17 Claims, No Drawings

TWO-COMPONENT COATING COMPOSITION, METHOD FOR HOMOGENEOUSLY MIXING A CURING COMPONENT INTO A BINDER COMPONENT, AND USE OF NANO PIGMENTS FOR PROVIDING A MARKER COLOR TO A CURING COMPONENT

CROSS-REFERENCE TO RELATED APPLICATIONS

This application is a 35 U.S.C. § 371 national phase application of PCT Application No. PCT/EP2019/064416 (WO 2019/233980 A1), filed on Jun. 4, 2019, which claims the benefit of priority to EP Application No. 18176579.3, filed on Jun. 7, 2018, each of which is incorporated herein by reference in its entirety.

FIELD OF THE INVENTION

The invention relates to an aqueous binder composition comprising three different dispersed polymers, to a coating composition comprising such aqueous binder composition, to a process for coating a substrate with such coating composition, and to a substrate coated with a coating deposited from such coating composition.

BACKGROUND OF THE INVENTION

A primer coat or undercoat is a preparatory coating applied on a substrate before applying a paint or topcoat. Priming ensures better adhesion of the paint or topcoat to the substrate, increases paint durability, and provides additional protection of the painted material. Applying a primer coat over an uncoated surface reduces the amount of paint being absorbed by the surface. A primer coat helps in hiding seams and joints and in hiding small defects. A primer coat increases the covering capacity of a paint applied over it. Without a primer coat, more coats of paint are needed to achieve the same aesthetic effect, thus increasing costs. Primers may be coloured or transparent. On wooden substrates, transparent or translucent primers are often desired, so that the structure of the wood remains visible. Since primer layers are typically over-coated with a paint or topcoat layer, an applied primer coating composition will typically be sanded as soon as it is sufficiently dry, so that a subsequent layer will adhere better to the primer layer. Fast drying and early sandability are particularly useful in primers, since it allows for quick overcoatability. Another desired property for primer coating compositions is a high solids volume, since that helps in filling and smoothing an uneven substrate surface.

Inorganic fillers, e.g. $CaCO_3$, clay, quartz, or carbon black, are often used to reduce raw material costs of paints and coatings, including primers. Such inorganic fillers may improve coating properties like tensile strength, hardness, abrasion resistance, thermostability, sandability and speed of drying. Disadvantages of the use inorganic fillers in coatings are loss of transparency, high viscosity build-up, and sedimentation. In transparent or translucent wood coatings, inorganic fillers cannot be used or only in very limited amounts.

In order to limit the amount of volatile organic compounds (VOC) in coating compositions, it is desirable to use water-based coating compositions, wherein resins (binder polymers) are dispersed in an aqueous phase. Such compositions are well-known in the art. In WO 00/24837 is for example disclosed an aqueous coating composition comprising a dispersed polyurethane resin with oxidatively drying groups and a dispersed polyurethane-acrylic hybrid as binders. In WO 2006/128875 is disclosed an aqueous coating composition comprising an emulsified alkyd, an emulsified acrylic polymer and a non-crosslinking alkali-soluble acrylic polymer.

There is a need for a coating composition that combines a low VOC with fast drying, good end-hardness, good early sandability, and a high solids volume, preferably without the use of inorganic fillers, so that it can be used as a primer composition, preferably as a transparent or translucent wood primer.

SUMMARY OF THE INVENTION

It has now been found that an aqueous binder composition with three different dispersed polymers, i.e. an acrylic polymer with a Tg between 80 and 120° C., an acrylic polymer with a Tg between 40 and 60° C., and a polyurethane modified acrylic polymer, provides, if used in a coating composition, a fast drying coating composition that results in a coating that has a relative high end-hardness and can be sanded early after application.

Accordingly, the invention provides in a first aspect an aqueous binder composition comprising three different dispersed polymers:
   a. an acrylic polymer with a Tg between 80 and 120° C.;
   b. an acrylic polymer with a Tg between 40 and 60° C.; and
   c. a polyurethane modified acrylic polymer,
wherein Tg is determined with differential scanning calorimetry according to ISO 16805 and ISO 11357-part 2 using a heating rate of 10 K/min.

The fast drying and high end hardness makes the binder composition particularly suitable for use in a coating composition. Therefore, in a second aspect, the invention provides a coating composition comprising the binder composition according to the first aspect of the invention.

Since such coating composition results in a coating with early sandability, it is particularly suitable as a primer coating composition. An important advantage of the coating composition according to the invention is that high end hardness and early sandability are obtained even in the absence of inorganic fillers. Therewith, the binder composition is particularly suitable to be used in transparent or translucent aqueous coating compositions, such as for example wood coatings, in particular wood primers.

In a third aspect, the invention provides a process for coating a substrate comprising the steps of:
   a. applying a layer of a coating composition according to the second aspect of the invention to the substrate or part of the substrate;
   b. allowing the layer of the coating composition to dry to obtain a dried coating layer;
   c. sanding the dried coating layer obtained in step b., preferably within 6 hours after application of the layer of the coating composition in step a., to obtain a sanded coating layer;
   d. optionally repeating steps a., b. and c. to obtain a second or further sanded coating layer;
   e. applying a top coat to the sanded coating layer of step c. or d.

In a fourth aspect, the invention provides a substrate coated with a coating deposited from a coating composition according to the second aspect of the invention.

DETAILED DESCRIPTION OF THE INVENTION

The aqueous binder composition according to the invention comprises three different dispersed polymers: an acrylic polymer a. with a Tg between 80 and 120° C.; an acrylic polymer b. with a Tg between 40 and 60° C.; and a polyurethane modified acrylic polymer c.

Reference herein to glass transition temperature (Tg) is to the Tg as measured with differential scanning calorimetry (DSC) according ISO 16805 and ISO 11357-part 2 using a heating rate of 10 K/min.

Reference herein to an acrylic polymer is to a polymer obtainable by polymerization, typically emulsion polymerization, of mono-ethylenically unsaturated acrylic monomers such as (meth)acrylic acid or esters of (meth)acrylic acid, optionally in combination with mono-ethylenically unsaturated vinyl or styrenic monomers. The acrylic monomers may comprise a polar functional group such as an acrylamide, alkyleneoxide or a hydroxy functional group. Examples of suitable monomers comprising a hydroxy functional group are hydroxyethyl acrylate, hydroxyethyl methacrylate, hydroxypropyl acrylate, and hydroxypropyl methacrylate. Acrylic polymers may be prepared from a mixture of monomers comprising a polar functional group and monomers free of such polar functional group, such as for example a mixture of hydroxyethyl acrylate and methyl methacrylate.

Acrylic polymers are well known in the art and also referred to as acrylics, acrylate polymer, polyacrylate, or acrylic resin. These polymers are known for their transparency, resistance to breakage, and elasticity and are commonly used in paints and coatings.

Acrylic polymers a. and b. preferably are pure acrylic polymers in the sense that the polymers do not comprise any monomers other than (meth)acrylic monomers and optionally further mono-ethylenically unsaturated comonomers that polymerize through radical polymerization.

Preferably, acrylic polymers a. and b. comprises less than 4 wt % styrene, more preferably less than 3 wt % styrene, even more preferably less than 2 wt % styrene, still more preferably preferred less than 1 wt % styrene, even more preferably acrylic polymers a. and b. are free of styrene. Reference herein to styrene is to styrene or to a styrene derivative such as an alkylated styrene that can be used as a monomer in a radical polymerization reaction.

Acrylic polymer a. has a glass transition temperature (Tg) between 80 and 120° C., preferably between 85 and 115° C., more preferably between 90 and 110° C., even more preferably between 93 and 103° C., still more preferably between 95 and 101° C. Acrylic polymer b. has a Tg between 40 and 60° C., preferably between 43 and 55° C., more preferably between 45 and 53° C., even more preferably between 45 and 50° C. The Tg of an acrylate polymer can be adjusted by choosing the amounts and types of the monomers used.

Polymer c. is a polyurethane modified acrylic polymer. Reference to a polyurethane modified acrylic polymer is to a hybrid of a polyacrylate and a polyurethane. Such hybrids may for example be formed by subjecting one or more acrylic monomers to free radical polymerisation conditions in the presence of a dispersion of an already chain-extended polyurethane resin using conventional techniques. This may for example be done by adding free radical initiators to a mixture of polyurethane dispersion and acrylic monomer or, alternatively, by gradually adding acrylic monomer to a polyurethane dispersion containing initiator. Alternatively, a solution of isocyanate-terminated urethane-prepolymer in acrylic monomer is formed. The solution is then emulsified in an aqueous medium and the isocyanate-terminated prepolymer is chain extended. Subsequently, either acrylic monomer can be added and the polymerisation thereof initiated or the polymerisation of the acrylic monomer can be initiated and further acrylic monomer can be added during polymerisation. Suitable examples of commercially available dispersions of polyurethane modified acrylic polymer include NeoPac E-125 ex. DSM and Hybridur® 570 Dispersion ex. Evonik.

It has been found that the binder composition of the invention can be prepared with a relatively high solids volume content, and thus results in a coating composition with a relatively high solids volume content if used therein. Preferably, the binder composition has a solids volume content of at least 35 vol %. More preferably, the binder composition has a solids volume content between 38 and 48 vol %, even more preferably between 40 and 46 vol %. Reference herein to solids volume content of a composition is to the percentage of the total volume of the composition that is taken by the non-volatile components in the composition. Solids volume content can suitably be determined according to ISO 3233 with drying at 23° C. and 50% relative humidity for 7 days. Typical non-volatile components include binders, pigments, and additives.

Preferably, the binder composition has a solids content of at least 35 wt %, more preferably between 38 and 55 wt %, even more preferably between 40 and 50 wt %, based on the total weight of the binder composition. Reference herein to solids content in wt % is to the solids contents as determined in accordance with ISO 3251:2008 wherein a sample is dried in an air-circulated oven at 125° C. for 1 hour.

Preferably, the particle size of any of dispersed polymers a., b., and c. is below 400 nm, more preferably below 300 nm. Even more preferably, the particle size of all three dispersed polymers is, independently, between 5 and 250 nm, still more preferably between 10 and 200 nm. Reference herein to particle size is to the average hydrodynamic particle size as determined by dynamic light scattering according to ISO 22412:2017.

It was found that the properties of the coating composition depend on the weight ratios of the three different dispersed polymers a., b., and c. in the binder composition. Preferably, the binder composition does not comprise any binder polymers other than polymers a., b. and c, and the weight % of polymer a. is between 19 and 50, the weight % of polymer b. between 20 and 50, and the weight % of polymer c. between 20 and 60; all weight percentages based the total weight of binder polymers a., b., and c. More preferably, the weight % of polymer a. is between 20 and 45; the weight % of polymer b. between 22 and 45; and the weight % of polymer c. between 25 and 55.

The coating composition according to the invention comprises the binder composition according to the invention and preferably does not comprise any binder polymer other than polymers a., b., and c.

The coating composition may be any suitable coating composition such as an architectural coating composition, a wood coating composition, a primer coating composition. Preferably, the coating composition is a primer coating composition, in particular a wood primer coating composition. Since primer layers are normally overcoated with one or more layers of paint, an important feature of a primer composition is how fast after its application it can be sanded. The faster it can be sanded, the quicker a layer of paint or topcoat can be applied.

It was found that coating compositions comprising the binder composition of the invention have a good hardness after drying, a good and early sandability, and allow for a high solids volume content, also in the absence of inorganic pigments such as extender pigments and color pigments (including white and luster pigments). The coating composition preferably has a solids volume content of at least 35 vol %, more preferably in the range of from 36 to 50 vol %. In case the coating composition is a varnish without inorganic pigments resulting in a transparent or translucent coating, it preferably has a solids volume content of at most 45 vol %, more preferably in the range of from 36 to 42 vol %. In case the coating composition comprises one or more inorganic pigments, it may have a higher solids volume content, for example in the range of from 38 to 50 vol %, more preferably of from 40 to 48 vol %.

In terms of weight, the coating composition preferably has a solids content of more than 30 wt %. More preferably, the solids content is between 35 and 50 wt % for a clear coating composition (without inorganic pigments), even more preferably between 37 and 47 wt %, still more preferably between 39 and 43 wt %. In case the coating composition comprises one or more inorganic pigments, the solids content is more preferably between 50 and 61 wt %, still more preferably between 53 and 59 wt %.

Preferably, the coating composition is a transparent (clear) or translucent coating composition. Therefore, the coating composition preferably comprises less than 5 wt % inorganic pigments, based on the total weight of the coating composition. Reference herein to inorganic pigments is to non-opacifying pigments (referred to as extender pigments or fillers) and opacifying pigments, including color, white and luster pigments. More preferably the coating composition comprises less than 1 wt % inorganic pigments, even more preferably is free of inorganic pigments. A transparent or translucent coating composition may comprise small amounts of inorganic additives such as for example silicone additives or inorganic thickeners. Preferably, the coating composition comprises less than 3 wt % inorganic additives, based on the total weight of the coating composition, more preferably less than 1 wt %, even more preferably less than 0.5 wt %.

In order to lower the effective glass transition temperature of the coating composition such that the coating composition forms a film at ambient conditions, the coating composition preferably comprises one or more coalescing solvents. Any coalescing solvent known to be suitable for use in aqueous coating compositions comprising an acrylic resin as a binder may be used. Such coalescing solvents are well known in the art and commercially available. Suitable coalescing solvents include glycol ethers, mixtures of glycol ethers and alcohols, dibasic esters, ester alcohols. Examples of suitable commercially available coalescing solvents include Lusolvan™ FBH (di-isobutyl ester of a mixture of dicarboxylic acids), Lusolvan™ PP (di-isobutyl ester of a mixture of dicarboxylic acids), Loxanol™ EFC 300 (linearic ester), Buty Carbitol™, Butyl Cellosolve, Dowanol™ EPh (ethylene glycol phenyl ether), Dowanol™ PPh (propylene glycol phenyl ether), Dowanol™ TPnB (tripropylene glycol n-butyl ether), Dowanol™ DPnB, DBE-9™ (a mixture of refined dimethyl glutarate and dimethyl succinate), Eastman DB™ solvent, Eastman EB™ (ethylene glycol monobutyl ether), Texanol™ (2,2,4-trimethyl-1,3-pentanediol monoisobutyrate), DAPRO™ FX 511, Velate™ 262, Arcosolve™ DPNB, Arcosolve™ TPnB. Preferably, the coating composition comprises a coalescing solvent in an amount in the range of from 0.1 to 15 wt %, more preferably of from 1 to 10 wt %, based on the total weight of the liquid coating composition. Based on the total weight of binder polymers (i.e. polymers a., b., and c. and further binder polymers if any), the coating composition preferably comprises a coalescing solvent in an amount between 10 and 30 wt %, more preferably between 13 and 25 wt %, still more preferably between 15 and 25 wt %, even more preferably between 18 and 22 wt %.

The liquid coating composition preferably comprises the coalescing solvent in an amount between 50 and 100 g/L, more preferably between 55 and 80 g/L. If the coating composition is a varnish, the amount of coalescing solvent is preferably between 70 and 80 g/L. If the coating composition is an opaque coating composition, the amount of coalescing solvent is preferably between 56 and 66 g/L.

The coating composition may comprise further components suitable for coating compositions, such as dyes, thickeners, and coating additives such as biocides, levelling agents, antifoaming agents, matting agents, or anti-settling agents. Such components are well known in the art. Any thickener known to be used in coating compositions may be used. Such thickeners include rheology modifying clays, and non-associative and associative organic thickeners. Preferably, the thickener is an organic thickener.

The invention further relates to a process for coating a substrate wherein a layer of a coating composition according to the second aspect of the invention is applied to the substrate or part of the substrate; the layer is then allowed to dry and sanded, preferably within 6 hours after application of the layer. Optionally the application of a layer, drying and sanding is repeated. A topcoat is applied in the last sanded layer.

The substrate may be any suitable substrate, for example wood, metal, plastic, or other suitable material or a combination thereof. Preferably the substrate is a wooden substrate. A layer of the coating composition is applied to the substrate. The layer may be applied using any suitable technique known in the art, such as by brush, roller, spaying, etc. The binder composition of the invention results in a quick drying coating layer that can be sanded within a few hours, preferably within 6 hours after application, such as within 5, 4, 3, 2 hours or even within 1 hour, preferably within 45 minutes. The sandability of the coating layer preferably is higher than 3.5, e.g. higher than 4.0 or 4.2, using the method specified in the examples section. Quick drying of the coating layer allows the painter to sand the coating layer early after application so that a further layer can be applied. The further layer may be another layer of the coating composition of the invention, e.g. another primer layer, or a top coat such as a high or medium gloss top layer which may be coloured.

In a final aspect the invention relates to a substrate coated with a coating deposited from a coating composition according to the second aspect of the invention. The coating on the substrate is obtained by allowing the applied coating composition to dry.

EXAMPLES

The invention is illustrated by means of the following non-limiting examples.

Test Methods

Indentation Hardness Hardness (Knoop)

The indentation hardness (Knoop) of a dried coating was measured using ASTM D1474, method A, 2013; Standard Test Methods for Indentation Hardness of Organic Coatings.

Viscosity Measurement

Viscosity measurements were done in accordance with ISO 3219 using a Physica rheology meter MCR 301, cone and plate method, unless otherwise specified.

Solids Volume Measurement

Solids volume content was determined according to ISO 3233 with drying at 23° C. and 50% relative humidity for 7 days.

Ease of Sanding

To evaluate the sandability (ease of sanding), a 100 μm coating layer is applied by brush on a sanded birch plywood panel and allowed to dry for 4 hours under standard conditions. The sample is then sanded using p400 sanding paper of SIA Abrasive Industries which was wrapped around a flat block of wood with dimensions 5.5×10×1 cm. The sanding paper was rubbed over the sample in the direction of the wood grain for 10 times, while pushing down with a force of 1-2 kg. The samples are ranked from 1 to 5 on dust production and friction level where dust production is a positive factor (more dust is better) and friction is a negative factor (less friction is better). The sanding process is repeated after application and drying of a second layer and the average of the ratings is calculated. The second layer is applied 6 hours after the first one.

Sandability is scored on a scale of 1 to 5 wherein 1=difficult to sand the substrate, poor sandability; and 5=very good sandability/easy to sand. Samples are tested and scored relative to one another.

Glass Transition Temperature

The glass transition temperature was determined in accordance with ISO 16805 and ISO 11357-part 2 using a heating rate of 10 K/min.

Film Formation at 10° C.

Film formation at difficult conditions (10° C. and 80% relative humidity (RH)) was determined as follows. A layer of coating composition with a wet film thickness of 135 μm was applied on a BYK black&white chart (uncoated, chart type 2831, 140×254 mm) using a K control coater (RK Print-Coat Instruments Ltd) fitted with an 0.7 mm screw rod. Before testing, the coating composition and the K control coater were equilibrated 10° C. and 80% RH for at least 2 hours. The applied coating film was dried at 10° C. and 80% RH for 24 hours and then equilibrated at 23° C. and 50% RH for one hour. The dried film was then judged on film cracking as follows:
  5: Film coalescing is excellent; homogeneous crack-free film
  4: Some cracks/stripes, visible by naked eye or magnifying glass
  3: Increased amount of cracks/stripes, visible by naked eye or magnifying glass
  2: A lot of cracks visible with naked eye
  1: Severe crack formation; can be easily seen with naked eye Acrylics Dispersion of Polymer a.

Mowilith LDM 7991 is an aqueous dispersion of an acrylic copolymer based on acrylic and methacrylic acid esters. It is sold by Celanese, has a solids content as determined in accordance with ISO 3251 (105° C.; 2 h) of 45 to 47%; a Brookfield viscosity (ISO 2555, 23° C.; 2/20) of 200 to 800 mPa·s; a pH value (ISO 976) of 8.0 to 9.0; and a Tg of 98° C.

Dispersion of Polymer b.

Mowilith LDM 7764 is an aqueous dispersion of an acrylic copolymer based on acrylic and methacrylic acid esters. It is sold by Celanese, has a solids content as determined in accordance with ISO 3251 (130° C.; 30 min) of 49-51%; a Brookfield viscosity (ISO 2555, 25° C.; 2/20) of 80 to 400 mPa·s; a pH value (ISO 976) of 8.5 to 9.5; and a Tg of 47° C.

Dispersion of Polymer c.

A polyurethane-modified acrylic polymer was prepared as described in Example 1 of U.S. Pat. No. 5,137,961. An urethane prepolymer was prepared with the process described in example 1 of U.S. Pat. No. 5,137,961 using dicyclohexylmethane diisocyanate as di-isocyanate compound, and poly(tetramethylene ether) glycol (Terathane® 1000) and dimethylolpropionic acid as polyols. Methyl methacrylate and butyl acrylate were used as acrylic monomers. In this way a polyurethane/acrylic polymer was prepared in a 50/50 weight ratio. The resulting aqueous dispersion of polyurethane modified acrylic polymer had a solids content of 38 wt %, a pH of 7.6 and a Brookfield viscosity of (Brookfield CAP2000, 23° C.) 0.63 Poise (63 mPa·s).

Coating Compositions

Coating compositions were prepared by mixing one or more of the polymer dispersions described above with Dowanol DPnB coalescing solvent, TEGO Airex 902w antifoaming agent, and Acrysol RM2020 thickener. All coating composition comprised 88.6 wt % polymer dispersion(s). The remaining 11.4 wt % was coalescing solvent, antifoaming agent, and thickener. For all coating compositions the solids volume content and viscosity was determined. The indentation hardness (Knoop kg/mm$^2$), ease of sanding, and film formation at 10° C. of the resulting coatings were determined. The results of these determinations are shown in Table 1. The viscosity was measured 24 hours after preparation of the coating composition; the indentation hardness (Knoop kg/mm$^2$) was measured of two layers of coating composition applied on top of each other with an interval of more than 18 hours (light sanding of first layer before applying the second layer). Samples U1-U4 are examples according to the invention, and samples C1-C8 are comparative examples.

The results in Table 1 show that a primer composition comprising the three different binders (U1, U2, and U3) scores good on sandability (>4.0), film formation (5), and Knoop hardness after 7 days (>2.9). Primers comprising only acrylic polymer b. have a low hardness after 7 days (C1). Primers with only polyurethane modified acrylic polymer as binder (C8) have a lower solids content (v/v %) than compositions of the invention. A high solids content is especially preferred in a primer to fill uneven areas in a surface.

Primers without polyurethane modified acrylic polymer as binder (C1, C3, C4) have a sandability of less than 4 (less than the compositions according to the invention). Increasing the amount of high Tg acrylic polymer (polymer a.) results in an improvement of the sandability (C1, C3, C4), but also in a low Knoop Hardness (7 days).

TABLE 1

Characteristics of primer compositions and primer coatings deposited from such compositions

| Coating composition[a] | wt % of polymer dispersion in formulation | | | Solids volume (v/v %) | Viscosity (in Pa·s) at different shear rates | | | Knop hardness (kg/mm²) | | | Sandability | Film-forming at 10° C. |
|---|---|---|---|---|---|---|---|---|---|---|---|---|
| | PUMA[b] | Mowilith LDM 7764 | Mowilith 7991 High Tg | | $0.1\ s^{-1}$ | $1\ s^{-1}$ | $10{,}000\ s^{-1}$ | 1 day | 3 days | 7 days | | |
| U1 | 26.6 | 35.4 | 26.6 | 38.1 | 0.95 | 0.73 | 0.058 | 1.1 | 2.1 | 2.9 | 4.3 | 5 |
| U2 | 26.6 | 26.6 | 35.4 | 37.8 | 0.74 | 0.69 | 0.055 | 3.2 | 3.4 | 3.5 | 4.3 | 3 |
| U3 | 53.2 | 17.7 | 17.7 | 35.7 | 0.21 | 0.19 | 0.041 | 3.2 | 3.0 | 4.6 | 4.0 | 5 |
| U4 | 53.2 | 17.7 | 17.7 | 35.7 | 0.28 | 0.22 | 0.042 | 2.1 | 3.6 | 4.0 | 4.0 | 5 |
| C1 | | 88.6 | | 41.9 | 6.39 | 2.66 | 0.071 | 0.2 | 0.5 | 0.6 | 3.3 | 5 |
| C3 | | 70.9 | 17.7 | 41.2 | 6.37 | 3.16 | 0.072 | 0.6 | 0.8 | 1.3 | 3.3 | 5 |
| C4 | | 53.2 | 35.4 | 40.6 | 6.22 | 3.75 | 0.074 | 1.0 | 1.5 | 2.1 | 3.7 | 5 |
| C5 | 44.3 | 44.3 | | 37.3 | 0.37 | 0.29 | 0.047 | 0.9 | 1.4 | 1.9 | 3.5 | 5 |
| C6 | 53.2 | | 35.4 | 35.1 | 0.29 | 0.26 | 0.044 | 8.7 | 5.1 | 8.0 | 4.0 | 1 |
| C7 | 70.9 | | 17.7 | 33.8 | 0.18 | 0.17 | 0.040 | 4.9 | 4.4 | 5.1 | 4.3 | 1 |
| C8 | 88.6 | | | 32.6 | 0.15 | 0.097 | 0.033 | 1.4 | 2.8 | 3.0 | 4.0 | 5 |

[a] compositions starting with "C" are reference compositions, those starting with "U" are compositions according to the invention.
[b] PUMA: polyurethane-modified acrylic polymer.

The invention claimed is:

1. An aqueous binder composition comprising the following three different dispersed polymers:
   a. an acrylic polymer with a Tg between 98 and 120° C.;
   b. an acrylic polymer with a Tg between 40 and 60° C.; and
   c. a polyurethane modified acrylic polymer,
   wherein Tg is determined with differential scanning calorimetry according to ISO 16805 and ISO 11357-part 2 using a heating rate of 10 K/min.

2. An aqueous binder composition according to claim 1, wherein the aqueous binder composition has a solids volume content of at least 35 vol %.

3. An aqueous binder composition according to claim 1, wherein polymer a. has a Tg between 98 and 110° C.

4. An aqueous binder composition according to claim 1, wherein polymer b. has a Tg between 43 and 55° C.

5. An aqueous binder composition according to claim 1, wherein the aqueous binder composition does not comprise any binder polymer other than polymers a., b., and c., and wherein the wt % of polymer a. is between 19 and 50, the wt % of polymer b. is between 20 and 50, and the wt % of polymer c. is between 20 and 60, based on the total weight of polymers a., b., and c.

6. A coating composition comprising the aqueous binder composition according to claim 1.

7. A coating composition according to claim 6, wherein the coating composition is a primer composition.

8. A coating composition according to claim 6, wherein the coating composition does not comprise any binder polymer other than polymers a., b., and c.

9. A coating composition according to claim 6, wherein the coating composition has a solids volume content of at least 35 vol %.

10. A coating composition according to claim 6, wherein the coating composition comprises less than 5 wt % inorganic pigments, based on the total weight of the coating composition.

11. A coating composition according to claim 10, wherein the coating composition has a solids volume content in the range of from 35 to 45 vol %.

12. A coating composition according to claim 6, wherein the coating composition comprises a coalescing solvent in an amount in the range of from 0.1 to 15 wt %, based on the total weight of the coating composition.

13. A process for coating a substrate comprising the steps of:
   a. applying a layer of a coating composition according to claim 6 to the substrate or part of the substrate;
   b. allowing the layer of the coating composition to dry to obtain a dried coating layer;
   c. sanding the dried coating layer obtained in step b. to obtain a sanded coating layer;
   d. optionally repeating steps a., b. and c. to obtain a second or further sanded coating layer;
   e. applying a top coat to the sanded coating layer of step c. or d.

14. A substrate coated with a coating deposited from a coating composition according to claim 6.

15. A substrate according to claim 14, wherein the substrate is a wooden substrate.

16. A coating composition according to claim 6, wherein the coating composition is free of inorganic pigments.

17. A process for coating a substrate according to claim 13, wherein step c. is performed within 6 hours after application of the layer of the coating composition in step a.

* * * * *